Patented Mar. 1, 1932

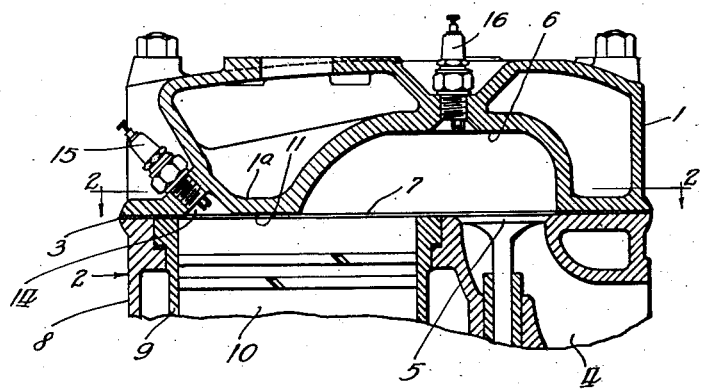
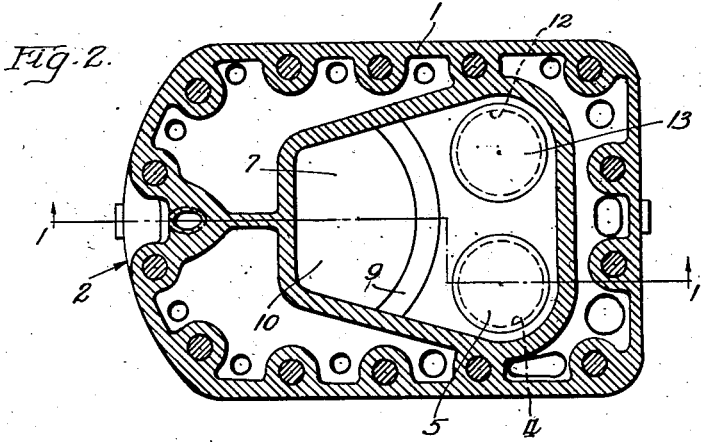
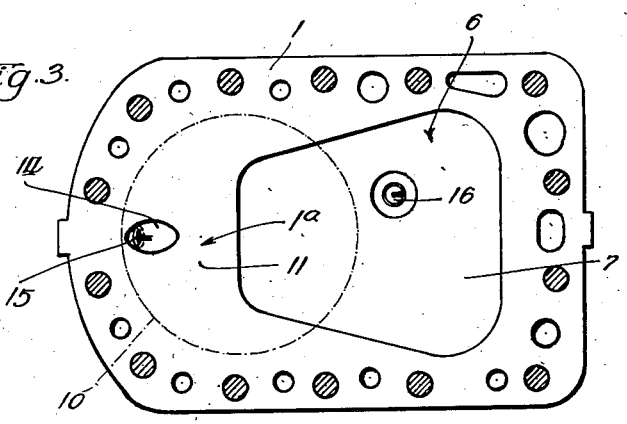
Inventor:
Harry L. Horning

1,847,612

UNITED STATES PATENT OFFICE

HARRY L. HORNING, OF WAUKESHA, WISCONSIN, ASSIGNOR TO WAUKESHA MOTOR COMPANY, OF WAUKESHA, WISCONSIN, A CORPORATION OF WISCONSIN

INTERNAL COMBUSTION ENGINE

Application filed November 15, 1929, Serial No. 407,336. Renewed September 4, 1931.

This invention relates to internal combustion engines, and more particularly to the combustion chamber and the immediate appurtenances thereof, to the end of numerous advantages in construction, operation and results.

In the drawings:—

Figure 1 is a vertical sectional view through an engine head and the upper portion of the cylinder block, of an engine constructed in accordance with my invention, taken substantially in the plane of line 1—1 of Figure 2;

Figure 2 is a section taken substantially on line 2—2 of Figure 1; and

Figure 3 is an underneath view of the engine head.

Head 1 is secured on the upper end or top of cylinder block 2 in a known manner, a gasket 3 being interposed between the head and the cylinder block. Block 2 is provided with a laterally extending inlet passage 4 controlled by an inlet valve 5, which opens upwardly and is operated in a known manner. This passage opens into a combustion chamber 6 formed in the under face of head 1, the inner portion of which overlies a portion of the cylinder area at one side thereof and has communication therewith through a throat 7. The under face of head 1 is flat or planar and overlies the cylinder area and is disposed close to the upper end of the cylinder 8, which comprises a liner 9, mounted in the cylinder block in a known manner, in which the piston 10 reciprocates. The throat 7 overlies one portion of the cylinder area and the flat under face of wall 1a of head 1 overlies another portion of the cylinder area, and the space between this wall and the piston 10, when in the position of greatest compression, is slight, as indicated at 11, providing a shielded area or space which occupies an appreciable portion of the cylinder area.

The block 2 is also provided with an exhaust passage 12 controlled by an upwardly opening exhaust valve 13 operated in a known manner, and the combustion chamber 6, which is offset laterally from the cylinder, as illustrated, overlies both the exhaust passage 12 and inlet passage 4.

The engine head 1 and the cylinder block 2 are cored out, where feasible, to permit circulation therethrough of a cooling medium, as is well known in the art. The structure illustrated and described provides a compact, turbulent producing combustion chamber and enables the use of high compression ratios.

In an engine of the type illustrated, having the offset type of combustion chamber, the successful operation of the engine depends upon its ability to keep the gases trapped in the shielded space 11 comparatively ineffective with regard to detonation. This is accomplished by means of the cooling effect of the large surface volume ratio of this space when the piston 10 is in its upper position, and by the high velocity of the gases issuing from this space just before the piston reaches its top position. I have found that the non-detonating properties of the gas in this shielded space 11 can be further improved by igniting the charge in the shielded space independently of ignition of the charge in the combustion chamber and in timed relation thereto, so that the charge in the shielded space is burned at comparatively low pressure and before it has been raised to a high pressure and temperature by the expansion and burning of the charge in the main combustion chamber, such as would be apt to cause detonation of the charge in the shielded space.

By thus igniting the charge in the shielded space, when the flame front in the main combustion chamber reaches the edge of the shielded space it will run into a pocket of burnt inert gas, instead of a pocket of highly compressed unburned fuel mixture, as occurs in present practice, and detonation will be prevented.

Wall 1a of head 1 is provided with a chamber 14 in the form of a pocket and which overlies the cylinder area. This chamber or pocket 14 is minute relative to the combustion chamber 6 and is preferably disposed at the opposite side of the cylinder area from the combustion chamber, though it may be otherwise disposed. A spark plug 15, of known type, is suitably secured in head 1 and the electrodes of this spark plug extend into the pocket 14 to within a short distance of the under face of wall 1a of the head. A similar spark plug 16 is suitably secured in head 1 in position to ignite the charge in combustion chamber 6. The charge in the shielded space 11 is ignited by spark plug 15, and the charge in the combustion chamber 6 is ignited by spark plug 16. The two spark plugs are so timed that the charge in space 11 is completely burned, or substantially so, before the flame front in the main combustion chamber 6 reaches the edge of the shielded space 11.

In order to assure that this will occur, the charge in the shielded space is preferably ignited slightly in advance of ignition of the charge in the combustion chamber 6. This may not be essential, however, in all cases as there may be instances where the combustion of the charge in the shielded space 11 is so much more rapid than the combustion of the charge in the combustion chamber that the two charges may be ignited simultaneously, or the charge in the shielded area may be ignited after the charge in the combustion chamber, and yet accomplished the desired result. Preferably, the charge in the shielded space is ignited in advance of the charge in the combustion chamber, as noted, although this is not essential in all instances, and my invention resides, in its broader aspects, in burning of the charge in the shielded space to such an extent as to prevent detonation of this charge due to increased pressure and temperature thereof incident to the expansion and burning of the main charge in the combustion chamber. I thus provide simple and efficient means for effectively preventing detonation in an engine of this type and obtain a more uniform flame propagation and smoother operation than is possible in engines of this type and of present construction. The engine, as a whole, is of simple construction and high efficiency and any tendency toward detonation is effectively counteracted.

What I claim is:—

1. In an internal combustion engine, a cylinder, a piston reciprocating in the cylinder, a head having a combustion chamber communicating with the cylinder and also having a portion overlying and close to the cylinder area, said overlying portion of the head forming with the piston, when said piston is in the position of greatest compression, a shielded area, intake and exhaust passages for supplying a fuel mixture to and exhausting burnt gases from the cylinder and the combustion chamber, valves for said passages, and means for originating combustion of the charge in the combustion chamber and the charge in the shielded area independently.

2. In an internal combustion engine, a cylinder, a piston reciprocating in the cylinder, a head having a combustion chamber overlying a portion of the cylinder area, the head also having a wall overlying and close to another portion of the cylinder area and forming with the piston, when said piston is in the position of greatest compression, a shielded area, intake and exhaust passages, valves for said passages, and means for originating combustion of the charge in the combustion chamber and the charge in the shielded area independently.

3. In an internal combustion engine, a cylinder, a piston reciprocating in the cylinder, a head having a combustion chamber overlying a portion of the cylinder area, the head also having a wall overlying and close to another portion of the cylinder area and forming with the piston, when said piston is in the position of greatest compression, a shielded area, intake and exhaust passages, valves for said passages, and means for originating combustion of the charge in the combustion chamber and the charge in the shielded area independently and in timed relation.

4. In an internal combustion engine, a cylinder, a piston reciprocating in the cylinder, a head having a combustion chamber overlying a portion of the cylinder area, the head also having a wall overlying and close to another portion of the cylinder area and forming with the piston, when said piston is in the position of greatest compression, a shielded area, intake and exhaust passages, valves for said passages, spark means for igniting the charge in the combustion chamber, and independent spark means for igniting the charge in the shielded area.

5. In an internal combustion engine, a cylinder, a piston reciprocating in the cylinder, a head having a combustion chamber, one portion of the combustion chamber overlying one portion of the cylinder area and another portion of said chamber being offset to one side of the cylinder area, said head also having a wall overlying and close to another portion of the cylinder area, said wall forming with the piston, when said piston is in the position of greatest compression, a shielded area, intake and exhaust passages, valves for said passages, and means for igniting the charge in the combustion chamber and the charge in the shielded area independently.

6. In an internal combustion engine, a cylinder, a piston reciprocating in the cylinder, a head having a combustion chamber overlying a portion of the cylinder area, the head having a wall overlying and close to the cylinder area, the wall forming with the piston, when said piston is in the position of greatest compression, a shielded area, said wall having a pocket overlying another portion of the cylinder area, the pocket being minute relative to the combustion chamber, inlet and exhaust passages, valves for said passages, means for igniting the charge in the combustion chamber, and independent means for igniting the charge in the pocket.

7. In an internal combustion engine, a cylinder, a piston reciprocating in the cylinder, a head having a combustion chamber overlying a portion of the cylinder area at one side thereof, the head having a wall overlying and close to the remainder of the cylinder area, the wall forming with the piston, when said piston is in the position of greatest compression, a shielded area, said wall having a pocket overlying another portion of the cylinder area at the opposite side thereof to the combustion chamber, said pocket being minute relative to said combustion chamber, inlet and exhaust passages, valves for said passages, means for igniting the charge in the combustion chamber, and independent means for igniting the charge in the pocket.

8. In an internal combustion engine, a cylinder, a piston reciprocating in the cylinder, inlet and exhaust passages disposed to one side of the cylinder, valves for said passages, a head having a combustion chamber overlying said passages and a portion of the cylinder area at one side thereof, the head having a wall overlying and closely adjacent another portion of the cylinder area and forming with the piston, when said piston is in the position of greatest compression, a shielded area, said wall having a pocket overlying another portion of the cylinder area, said pocket being minute relative to the combustion chamber, means for igniting the charge in the combustion chamber, and separate means for igniting the charge in the pocket.

9. In an internal combustion engine, a cylinder, a piston reciprocating in the cylinder, inlet and exhaust passages disposed to one side of the cylinder, valves for said passages, a head having two chambers, one of said chambers being a combustion chamber and overlying said passages and a portion of the cylinder area at one side thereof, the other chamber overlying a portion of the cylinder area at the other side thereof, said head having a wall intermediate the chambers and overlying and closely adjacent a third portion of the cylinder area, the wall forming with the piston, when said piston is in the position of greatest compression, a shielded area, means for igniting the charge in the combustion chamber, and separate means for igniting the charge in the shielded area.

10. In an internal combustion engine, a cylinder, a piston reciprocating in the cylinder, a head having two chambers overlying different portions of the cylinder area, one of the chambers being a combustion chamber, the head also having a wall overlying and closely adjacent a portion of the cylinder area, said wall forming with the piston, when said piston is in the position of greatest compression, a shielded area, means for igniting the charge in the combustion chamber, and means for igniting the charge in the shielded area in advance of ignition of the charge in said combustion chamber.

11. In an internal combustion engine, a cylinder, a piston reciprocating in the cylinder, a head having a combustion chamber overlying a portion of the cylinder area, the head also having a wall overlying and closely adjacent a portion of the cylinder area and forming with the piston, when said piston is in the position of greatest compression, a shielded area, inlet and exhaust passages, valves for the passages, means for igniting the charge in the combustion chamber, and means for igniting the charge in the shielded area in advance of ignition of the charge in said combustion chamber.

In witness whereof, I hereunto subscribe my name this 11th day of November, 1929.

HARRY L. HORNING.